(12) United States Patent
Sato

(10) Patent No.: US 8,456,687 B2
(45) Date of Patent: *Jun. 4, 2013

(54) IMAGE DATA PROCESSING APPARATUS, IMAGE DATA PROCESSING METHOD, AND PROGRAM

(75) Inventor: Yoshinobu Sato, Kanagawa-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,744

(22) Filed: Apr. 4, 2012

(65) Prior Publication Data

US 2012/0195512 A1 Aug. 2, 2012

Related U.S. Application Data

(63) Continuation of application No. 11/557,742, filed on Nov. 8, 2006.

(30) Foreign Application Priority Data

Nov. 9, 2005 (JP) ................................. 2005-325296
Sep. 5, 2006 (JP) ................................. 2006-240793

(51) Int. Cl.
*G06K 15/00* (2006.01)
*G06K 9/36* (2006.01)
*G06F 3/12* (2006.01)
*H04N 1/46* (2006.01)

(52) U.S. Cl.
USPC ......... 358/1.16; 358/1.15; 358/1.17; 358/1.1; 358/539; 382/233; 382/203

(58) Field of Classification Search
None
See application file for complete search history.

(56) References Cited

U.S. PATENT DOCUMENTS

| 5,798,843 | A * | 8/1998 | Yamamoto et al. | 358/404 |
| 6,798,917 | B2 * | 9/2004 | Fujiwara et al. | 382/240 |
| 2006/0067584 | A1 * | 3/2006 | Sato | 382/239 |
| 2007/0024935 | A1 * | 2/2007 | Yamamoto | 358/537 |

FOREIGN PATENT DOCUMENTS

| JP | 9-247423 | 9/1997 |
| JP | 11-146184 | 5/1999 |
| JP | 2003-092674 | 3/2003 |
| JP | 2003-296054 | 10/2003 |

* cited by examiner

*Primary Examiner* — Vincent Rudolph
*Assistant Examiner* — Marcus T Riley
(74) *Attorney, Agent, or Firm* — Fitzpatrick, Cella, Harper & Scinto

(57) ABSTRACT

The image rotation apparatus includes a first storage unit adapted to store compressed image data, and a decompression unit adapted to decompress the image data read out from the first storage unit, and segments the image data obtained from the decompression unit into a plurality of areas. The apparatus further includes a second storage unit adapted to sequentially perform a rotation process on the image data of segmented area, and store the rotated image data, a compression unit adapted to compress the image data of each area read out from the second storage unit, and a third storage unit adapted to sequentially store the image data of each area obtained from the compression unit. There is provided the image data processing apparatus having the above configuration, which rotates the image data while reducing the storage capacity of the buffer memory for storing the image data.

14 Claims, 13 Drawing Sheets

FIG. 12
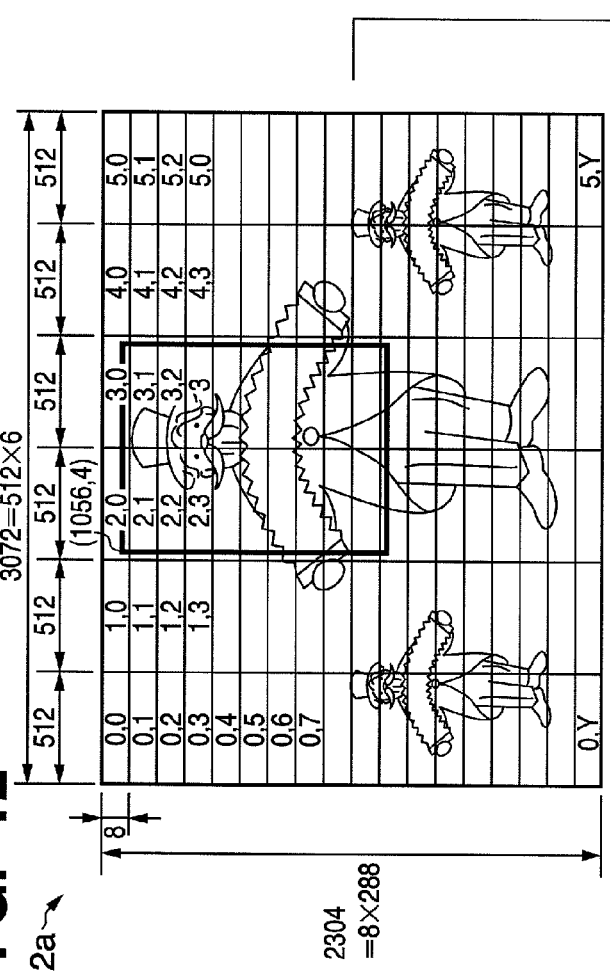
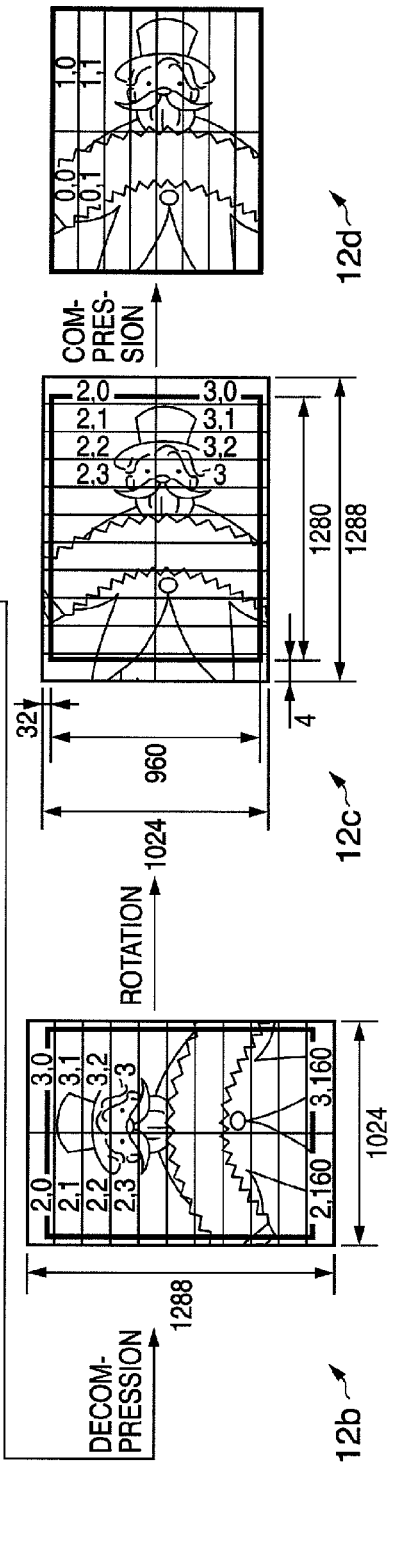

IMAGE DATA PROCESSING APPARATUS, IMAGE DATA PROCESSING METHOD, AND PROGRAM

CROSS REFERENCE TO RELATED APPLICATION

This application is a continuation of U.S. application Ser. No. 11/557,742, filed Nov. 8, 2006 (currently pending), which is incorporated by reference herein in its entirety, as if fully set forth herein, and claims the benefit of priority under 35 U.S.C. §119, based on Japanese Priority Application No. 2005-325296, filed Nov. 9, 2005 and Japanese Priority Application No. 2006-240793, filed Sep. 5, 2006, which are incorporated by reference herein in their entirety, as if fully set forth herein.

BACKGROUND OF THE INVENTION

1. Field of the Invention

The present invention relates to an image data processing apparatus, image data processing method, and program which perform the image data process of rotating a display image.

2. Description of the Related Art

Conventionally, an image data processing apparatus, which performs a rotation on a display image, needs a page memory for storing one-page image data of the display image before carrying out the rotation, and a page memory for storing one-page image data of the display image after the rotation. However, since the amount of data contained in an image has been growing due to increasing resolution of a display image, a page memory having a large storage capacity is necessary for the rotation of the display image. The page memory needs storage capacity for storing two-screen image data, resulting in a considerable increase in cost. As a solution to this problem, the following image data processing method which performs an image rotation on image data has been proposed. That is, a restart marker as a JPEG control code is added to JPEG compression-coded image data and compressed image data is decoded for each stripe having a predetermined width. Accordingly, a method for reducing the storage capacity of a buffer memory necessary for storing the decoded image data has been proposed.

The following method has also been proposed. An image data processing apparatus, which can perform a rotation on a display image, divides input image data into bands, rearranges the reading order of the band-divided image data in accordance with the rotation angle, and performs a compression process for each band. This eliminates the necessity of performing skip reading of compressed code in a decompression process for image data, thereby enabling a decompression process to be performed in real time.

However, a conventional image data processing apparatus such as a digital camera cannot decompress original image data that is compression-coded by a JPEG compression scheme, rotating the decompressed image data, and then recording the rotated image data.

[Patent Reference 1] Japanese Patent Laid-Open No. 09-247423

[Patent Reference 2] Japanese Patent Laid-Open No. 2003-092674

SUMMARY OF THE INVENTION

An image data processing apparatus and a method therefore disclosed in patent reference 1 encode compressed image data for each stripe having a predetermined width. In contrast to the structure of typical JPEG-compressed image data, a player that can play back the image data for each stripe is necessary. Accordingly, there exists the problem that a typical digital camera or the like cannot play back the image data.

Similarly, in the image data processing apparatus and image data processing method disclosed in patent reference 2, a DMA interface controls to read out compressed image data from a buffer memory for each band in a decompression process for the image data. The DMA interface is selectively switched to provide the readout image data for a decompression unit to sequentially perform a decompression process. Accordingly, there is a need to rasterize all the compressed data in buffer memory for performing a decompression process. There is also a need to encode the compressed image data for each stripe having a predetermined width. In contrast to the structure of typical JPEG-compressed image data, a player that can play back the image data for each stripe is necessary. Consequently, again there exists a problem that a typical digital camera or the like cannot play back the image data.

The present invention has as its object to reduce the storage capacity of buffer memory for storing image data. The present invention also has as its object to perform a rotation on an image while reducing the storage capacity of buffer memory, and to enable a typical player and digital camera to play back image data while maintaining image data format compatibility.

According to an aspect of the present invention, there is provided an image data processing apparatus comprising:

a first storage unit adapted to store compressed image data;

a decompression unit adapted to decompress the image data read out from the first storage unit;

a second storage unit adapted to segment the image data obtained from the decompression unit into a plurality of image data of segmented area, sequentially perform a rotation process on the plurality of image data of segmented area, and store the rotated image data;

a compression unit adapted to compress the image data of segmented area read out from the second storage unit; and a third storage unit adapted to sequentially store the image data of segmented area obtained from the compression unit.

According to another aspect of the present invention, there is provided An image data processing method comprising the steps of:

storing compressed image data in a first storage unit;

decompressing the image data read out from the first storage unit;

segmenting the image data obtained in the decompression step into a plurality of image data of segmented area;

sequentially performing a rotation process on the plurality of image data of segmented area, storing the rotated image data in a second storage unit;

compressing the image data of segmented area read out from the second storage unit; and storing, in a third storage unit, the image data of segmented area obtained in the compression step.

According to still another aspect of the present invention, there is provided An image data processing apparatus comprising:

a first storage unit adapted to store image data compressed for each block;

a decompression unit adapted to decompress, for the each block, the image data read out from the first storage unit;

a second storage unit adapted to segment the image data obtained from the decompression unit into a plurality of areas in an integer multiple for the each block, sequentially performing a rotation process on the image data of each segmented area in an integer multiple for the each block, and storing the rotated image data;

a compression unit adapted to compress the image data of the each area read out from the second storage unit; and a third storage unit adapted to sequentially store the image of the each area obtained from the compression unit.

According to still another aspect of the present invention, there is provided An image data processing apparatus comprising:

a first storage unit adapted to store image data compressed for each block;

a decompression unit adapted to decompress, for the each block, the image data read out from the first storage unit;

a trimming unit adapted to trim, in an integer multiple for the each block, the image data obtained from the decompression unit;

a second storage unit adapted to sequentially perform, in an integer multiple for the each block, a rotation process on the image data obtained from the trimming unit, and store the rotated image data;

a compression unit adapted to compress the image data of the each area read out from the second storage unit; and a third storage unit adapted to sequentially store the image data of the each area obtained from the compression unit.

According to still another aspect of the present invention, there is provided An image data processing apparatus comprising:

a first storage unit adapted to store image data compressed for each block;

a trimming designation unit adapted to designate trimming of the image data;

a decompression unit adapted to decompress, for the each block, the image data read out from the first storage unit;

a first trimming unit adapted to trim, in an integer multiple for the each block, the image data obtained from the decompression unit;

a second storage unit adapted to sequentially perform, in an integer multiple for the each block, a rotation process on the image data obtained from the first trimming unit, and store the rotated image data;

a second trimming unit adapted to trim a trimming area designated in the trimming designation unit, and read out the image data stored in the second storage unit;

a compression unit adapted to compress the image data trimmed in the second trimming unit; and a third storage unit adapted to sequentially store the image data of the each area obtained from the compression unit.

According to still another aspect of the present invention, there is provided a program stored in a storage medium comprising codes which cause a computer to execute an image data processing method according to the above aspects.

According to the present invention, an image rotation for rotating image data makes it possible to reduce the storage capacity of a buffer memory for storing the image data. The image rotation also makes it possible to maintain image data format compatibility so that typical player, digital camera, and the like can play back the image data.

Further features of the present invention will become apparent from the following description of exemplary embodiments with reference to the attached drawings.

BRIEF DESCRIPTION OF THE DRAWINGS

FIG. 12 is a view for explaining the trimming process by the image sensing apparatus according to the second embodiment of the present invention.

DESCRIPTION OF THE EMBODIMENTS

<First Embodiment>

The first embodiment of the present invention will now be described with reference to FIGS. 1 to 9.

Figure 1:
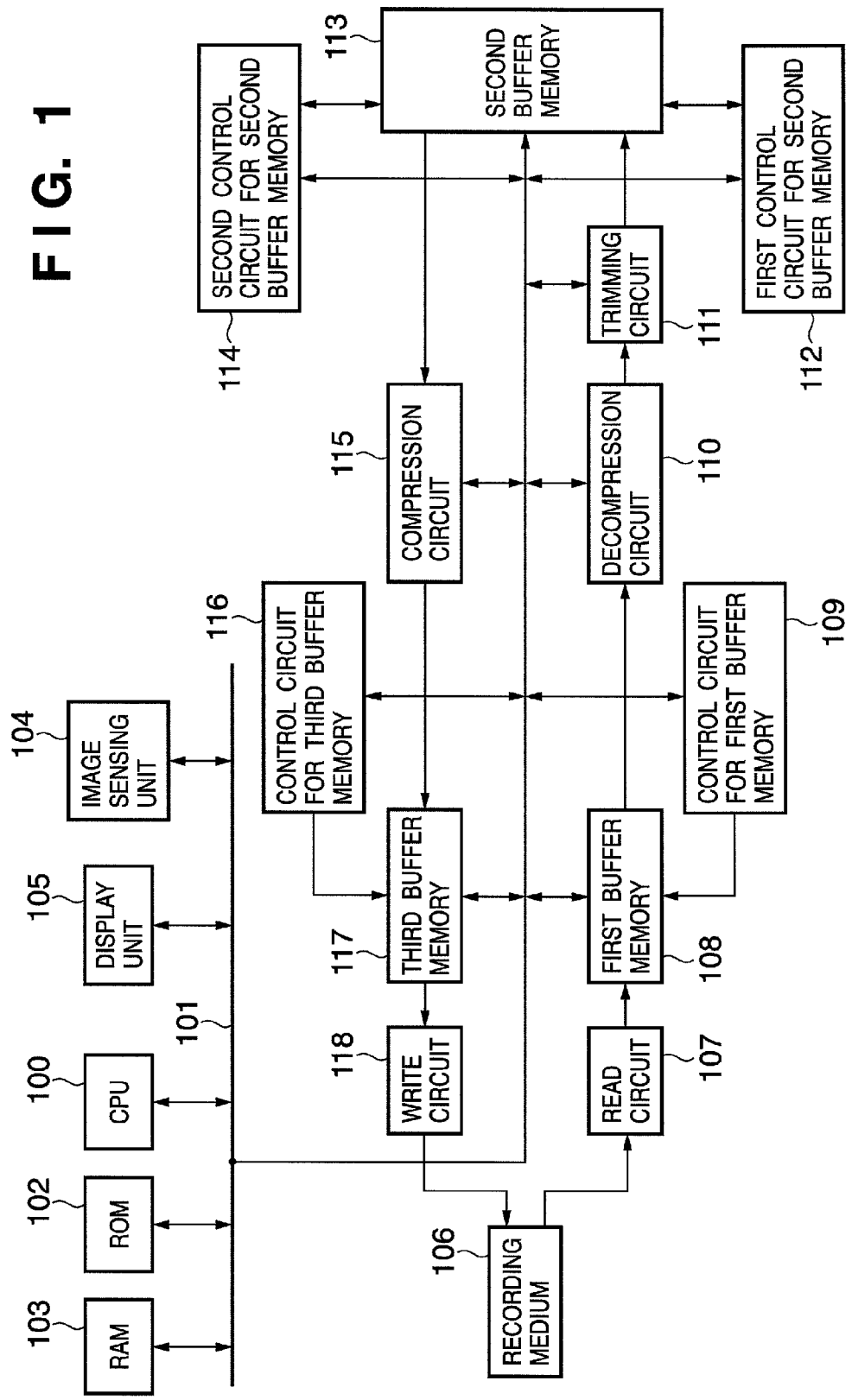
FIG. 1 is a block diagram showing an example of the system configuration of an image sensing apparatus as an image data processing apparatus according to the first embodiment of the present invention.

FIG. 1 is a block diagram schematically showing the system configuration of an image sensing apparatus as an image data processing apparatus according to the first embodiment of the present invention. In FIG. 1, reference numeral 100 denotes a CPU (Central Processing Unit) which controls the overall system of the image sensing apparatus shown in FIG. 1.

Reference numeral 101 denotes a system bus. The CPU 100 controls respective circuit blocks via the system bus 101. The CPU 100 uses part of a RAM (Random Access Memory) 103 as a work area in accordance with a program which is stored in a ROM (Read Only Memory) 102 to implement the embodiment. Reference numeral 104 denotes an image sensing unit. The image sensing unit 104 includes a lens system to which a CCD, stop, shutter mechanism, and the like are mounted, as is well known. Reference numeral 105 denotes a display unit for which an LCD (Liquid Crystal Display) or the like is used. The display unit 105 is used as a monitor for an object to be sensed or a monitor for playing back sensed image data. Reference numeral 106 denotes a recording medium such as a removable memory card incorporating a semiconductor memory device. The recording medium 106 is not limited to a semiconductor memory device, and other recording media are also available. A first buffer memory 108 temporarily stores part or all of image data compression-coded by JPEG (Joint Photographic Expert Group) or the like, which is read out from the recording medium 106 via a read circuit 107. The first buffer memory 108 comprises a conventional DRAM (Dynamic Random Access Memory).

A control circuit 109 for the first buffer memory 108 comprises a direct memory access controller (to be referred to as "DMAC" hereinafter) which sequentially DMA-transfers JPEG-compressed image data from the first buffer memory 108 to a decompression circuit 110. The decompression circuit 110 decodes the image data by decompressing the image data compression-coded by JPEG or the like.

Reference numeral 111 denotes a trimming circuit which extracts and outputs the whole image data or a rectangular image data area which is extracted from the image data decompressed in the decompression circuit 110.

A first control circuit 112 for second buffer memory is a DMAC for DMA-transferring the image data extracted in the trimming circuit 111 to the second buffer memory 113. The image sensing apparatus also includes a second control circuit 114 for the second buffer memory for controlling the second buffer memory 113. The second control circuit 114 for the second buffer memory comprises a DMAC for DMA-transferring the image data stored in the second buffer memory 113 to a compression circuit 115.

By a block coding process such as JPEG, the compression circuit 115 compression-codes the image data read out from the second buffer memory 113. Reference numeral 117 denotes a third buffer memory which stores part or all of the JPEG-compressed image data compression-coded in the compression circuit 115. A control circuit 116 for the third buffer memory controls the third buffer memory 117. The compressed image data output from the third buffer memory 117 is written in the recording medium 106 via a write circuit 118.

Note that it is possible to allocate the first buffer memory 108, second buffer memory 113 and third buffer memory 117 in the RAM 103. Also, another RAM can be provided independently, in which the first buffer memory 108, second buffer memory 113 and third buffer memory 117 can be allocated.

Figure 2:
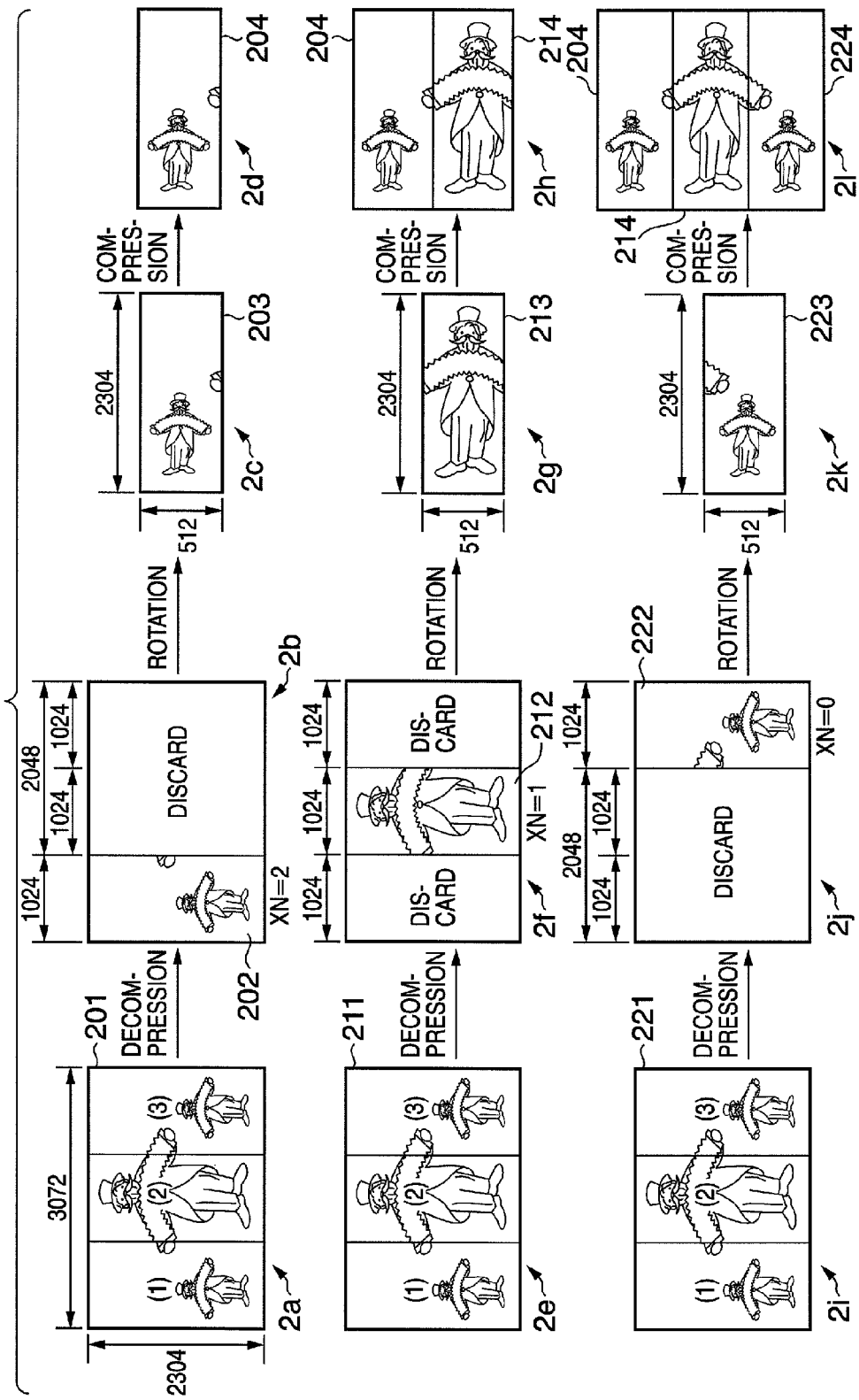
FIG. 2 is a view for explaining a 90° rotation by the image sensing apparatus according to the first embodiment of the present invention.

Reference symbols 2a to 2l of FIG. 2 are views for explaining a case in which JPEG-compressed image data is rotated clockwise by 90°. Reference symbols 2a to 2l of FIG. 2 show the transition states of a decompression, rotation, and compression for a display image.

In FIG. 2, 2a shows JPEG-compressed image data 201 loaded into the first buffer memory 108, and 2b shows the first decompression process for the JPEG-compressed image data, in which image data 202 in a rectangular area (1) positioned on the left side of the JPEG-compressed image data shown in 2a is selected, decompressed, output and trimmed. In FIG. 2, 2c shows a process of rotating the image data 202 in the rectangular area (1) clockwise by 90°. With this process, image data 203 can be obtained. The second buffer memory 113 then stores the image data 203.

In FIG. 2, 2d shows image data 204 in the rectangular area (1) stored in the third buffer memory 117, which is obtained by compressing the 90°-rotated image data 203 in the rectangular area (1). In this manner, the image data in the rectangular area (1) positioned on the left side of 2a is rotated.

In FIGS. 2, 2e to 2h show the second processing state of JPEG-compressed image data 211 as in the case shown in 2a to 2d. In this case, image data in a rectangular area (2) positioned in the middle of the image data in 2e is selected to undergo the same processes. Referring to 2e to 2h of FIG. 2, in these processes, image data 212 and 213 are sequentially obtained and image data 214 is accumulated adjacent to the image data 204 in the rectangular area (1) stored in the third buffer memory 117.

Finally, in FIGS. 2, 2i to 2l show the third processing state of the JPEG-compressed image data as in the case shown in 2a to 2d. In this case, image data in a rectangular area (3) positioned on the right side of the image data in 2i is selected to undergo the same processes. Referring to 2i to 2l, in these processes, image data 222 and 223 are sequentially obtained and image data 224 is eventually accumulated adjacent to the image data 204 and 214. In this manner, it is possible to rotate the compressed image data which is stored in the first buffer memory 108, shown in 2a of FIG. 2, and to store the rotated image data in the third buffer memory 117 as shown in 2l of FIG. 2.

On the other hand, in FIGS. 3, 3a to 3l are views for explaining a case in which JPEG-compressed image data is rotated clockwise by 270°. Namely, 3a to 3l show states of a decompression, rotation, and compression for a display image.

Figure 3:
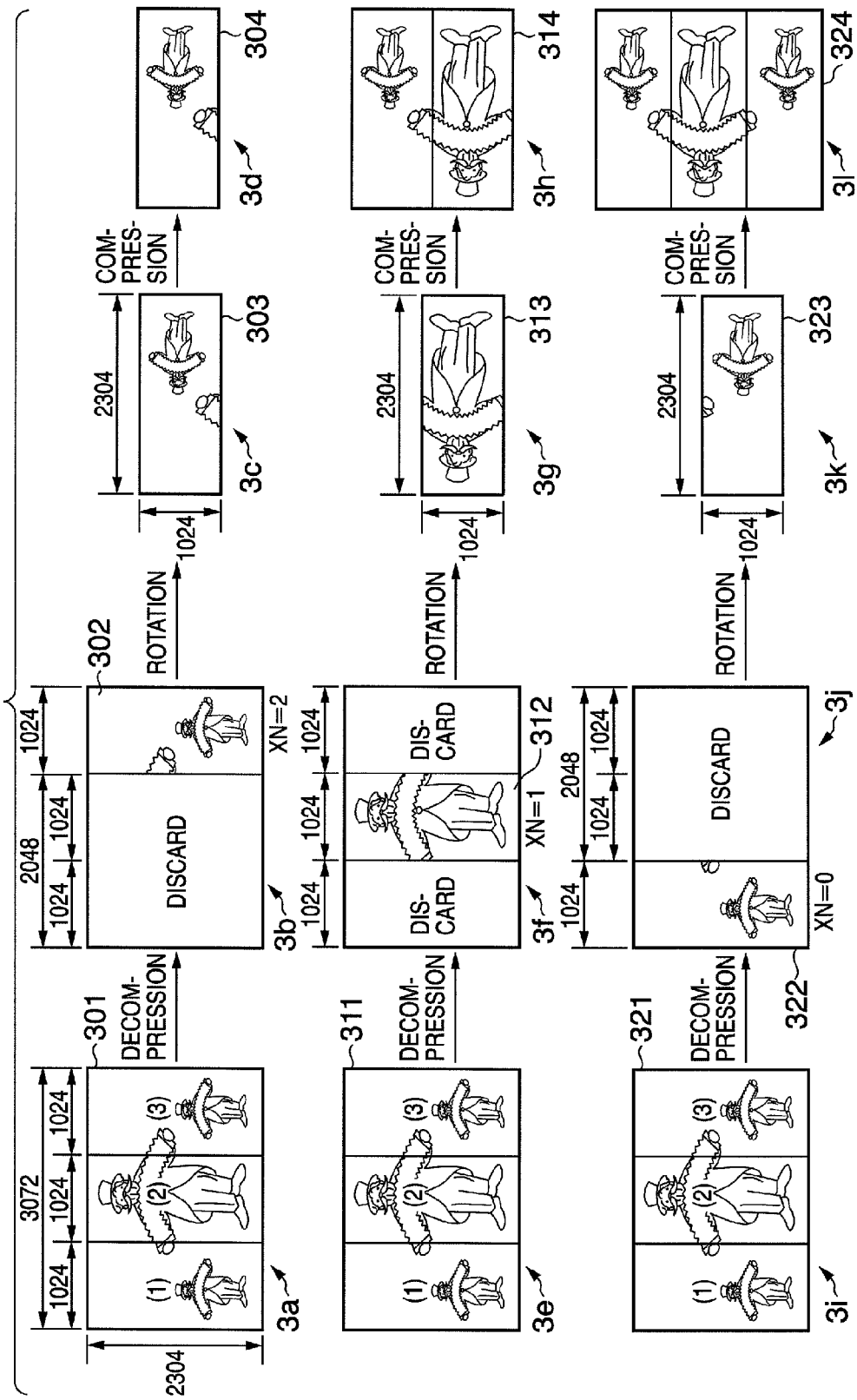
FIG. 3 is a view for explaining a 270° rotation by the image sensing apparatus according to the first embodiment of the present invention.

In FIG. 3, 3b shows a trimming process of selecting and outputting image data in a rectangular area (3) positioned on the right side of decompressed image data, and 3c shows a 270° rotation for the image data in the rectangular area (3). In FIG. 3, 3d shows image data in the rectangular area (3) which is obtained by performing a compression process on the 270°-rotated image data in the rectangular area (3). As in the case shown in 2a to 2l of FIG. 2, image data 301 is transformed to image data 302 and then to image data 303. Finally, the image data in the rectangular area (3) positioned on the right side of 3a undergoes the rotation to obtain image data 304.

In FIGS. 3, 3e to 3h show the second processing state of the JPEG-compressed image data as in the case shown in 3a to 3d of FIG. 3. In this case, image data in a rectangular area (2) positioned in the middle of the image data in 3a is selected to be processed. Image data 311 is transformed to image data 312 and then to image data 313. Finally, the image data in the rectangular area (2) positioned in the middle of 3a undergoes the rotation to obtain image data 314.

Finally, in FIGS. 3, 3i to 3l show the third processing state of the JPEG-compressed image data as in the case shown in 3a to 3d of FIG. 3. In this case, image data in a rectangular area (1) positioned on the left side of the image data in 3i is selected to be processed. Image data 321 is transformed to image data 322 and then to image data 323. Finally, the image data in the rectangular area (1) positioned on the left side of 3a undergoes the rotation to obtain image data 324. In this manner, the rotation for the whole compressed image data completes.

Figure 4:
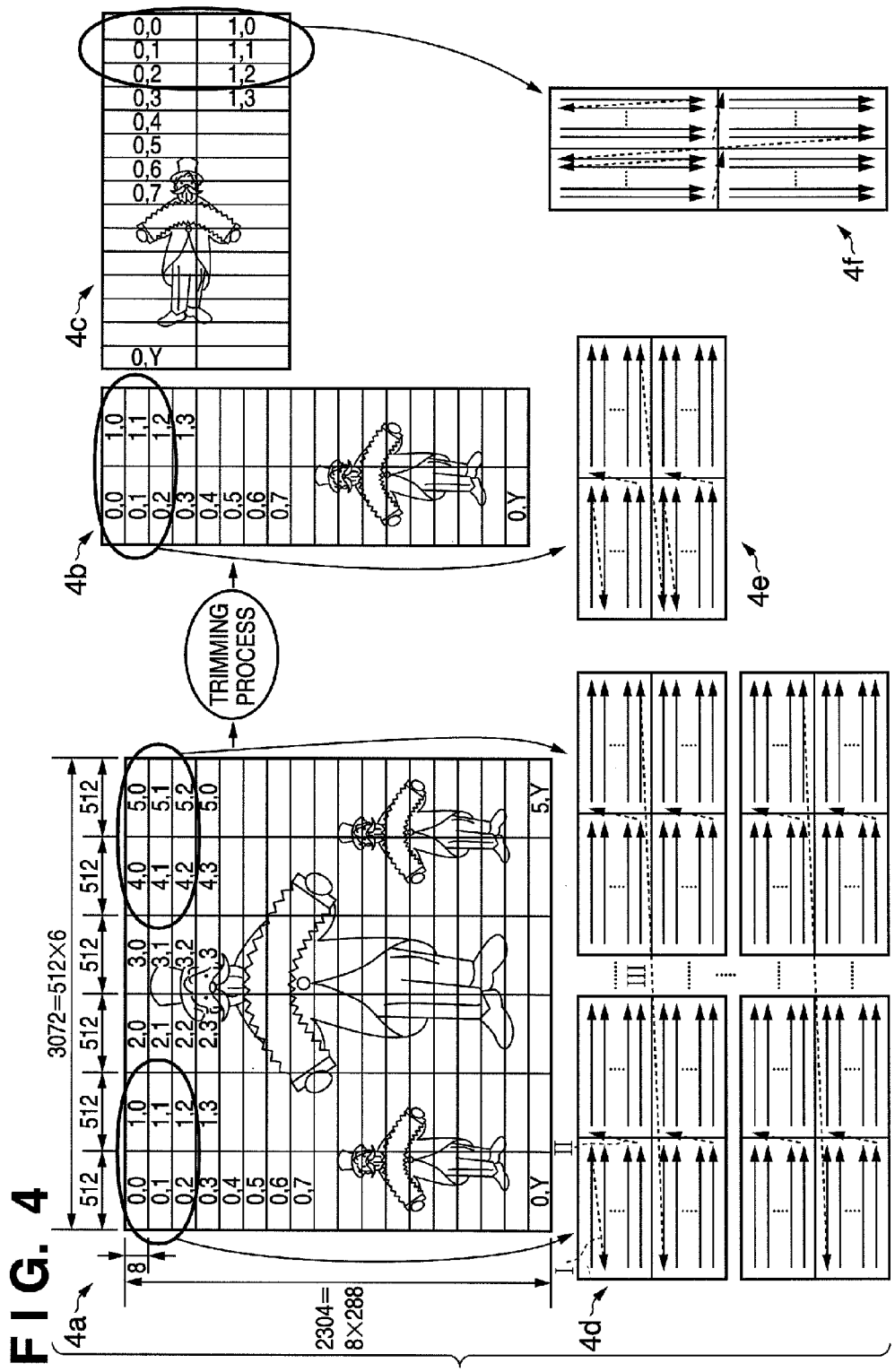
FIG. 4 is a view for explaining a 90° rotation by the image sensing apparatus according to the first embodiment of the present invention.

In FIG. 4, reference symbols 4a to 4f are views for explaining details of a case in which JPEG-compressed image data is rotated by 90°. In FIG. 4, 4a shows a state in which the JPEG-compressed image data compression-coded for each block is decompressed for each block to output raster data for each block and 4b shows a state for each block after a masking process. Further, 4c shows a state in which data for each block is rotated by 90°, 4d is a schematic view for explaining an operation showing details of 4a in FIG. 4. Further, 4e is a schematic view for explaining an operation showing details of 4b, and 4f is a schematic view for explaining an operation showing details of 4c in FIG. 4.

Figure 5A:
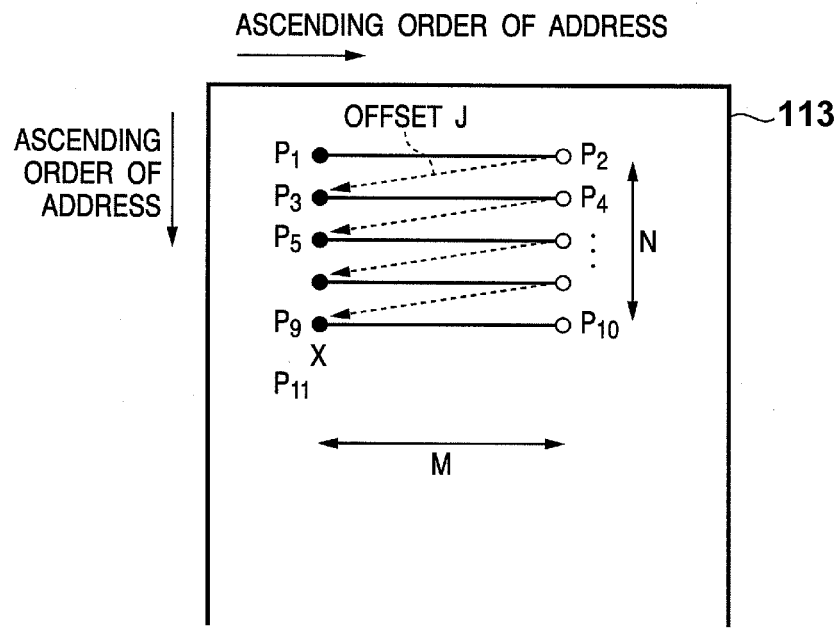
FIGS. 5A and 5B are views for explaining the concept of two-dimensional data transfer by the image sensing apparatus according to the first embodiment of the present invention.
Figure 5B:
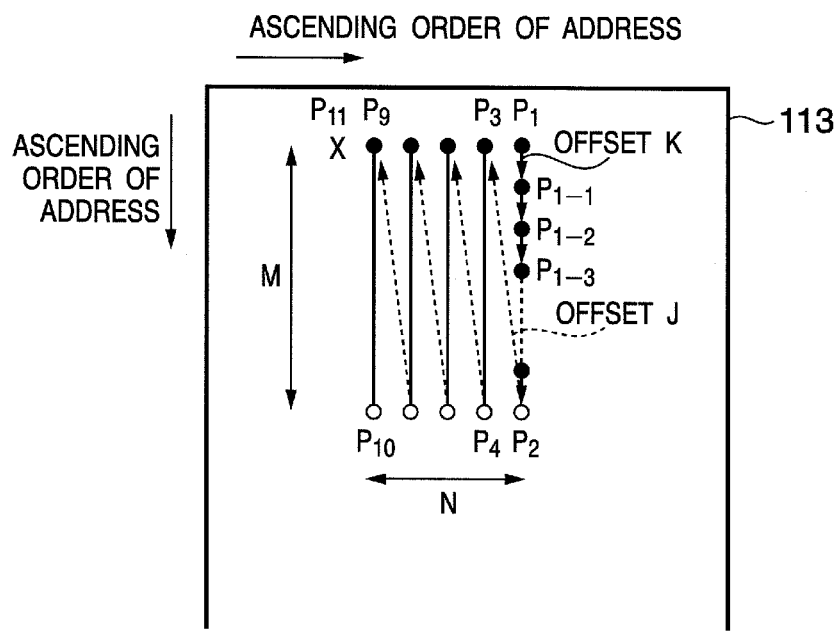

FIGS. 5A and 5B are schematic views for explaining the operations of the first control circuit 112 for the second buffer memory and the second control circuit 114 for the second buffer memory. The first control circuit 112 for the second buffer memory and the second control circuit 114 for the second buffer memory consider the second buffer memory 113 as a two-dimensional plane. They transfer image data in the rectangular area to the second buffer memory 113, and transfer the image data in the rectangular area on the second buffer memory 113.

In FIG. 5A, reference symbols P1, P2, P3, P4, P5, P6, ... denote addresses; N, the number of lines of image data in the rectangular area to be transferred; and M, the number of pixels (words) of one-line image data. The values of offset distances J represented by dotted lines are P3-P2, P5-P4, ... and are all equal to each other. Therefore, it is possible to achieve the transfer of the image data in the rectangular area by repeating, N times, the transfer of M words beginning from the pointer P1 at the left end in FIG. 5A.

FIG. 5B shows an operation which performs a 90° rotation on the rectangular area stored in the second buffer memory 113 to transfer the data. In FIG. 5B, reference symbols P1, P2, P3, P4, P5, P6, ... and P1-1, P1-2, P1-3, ... denote addresses; M, the number of lines of the image data in the rectangular area to be transferred; and N, the number of pixels (words) of 1-line image data. The values of offset distances K are (P1-1)-P1, (P1-2)-(P1-1), ... and are all equal to each other. The values of the offset distances J represented by dotted lines are P2-P3, P4-P5, ... and are all equal to each other. Therefore, it is possible to achieve the transfer of each rectangular area by repeating, N times, transfer of image data of M lines beginning from the pointer P1 at the right end in FIG. 5B.

Figure 6:
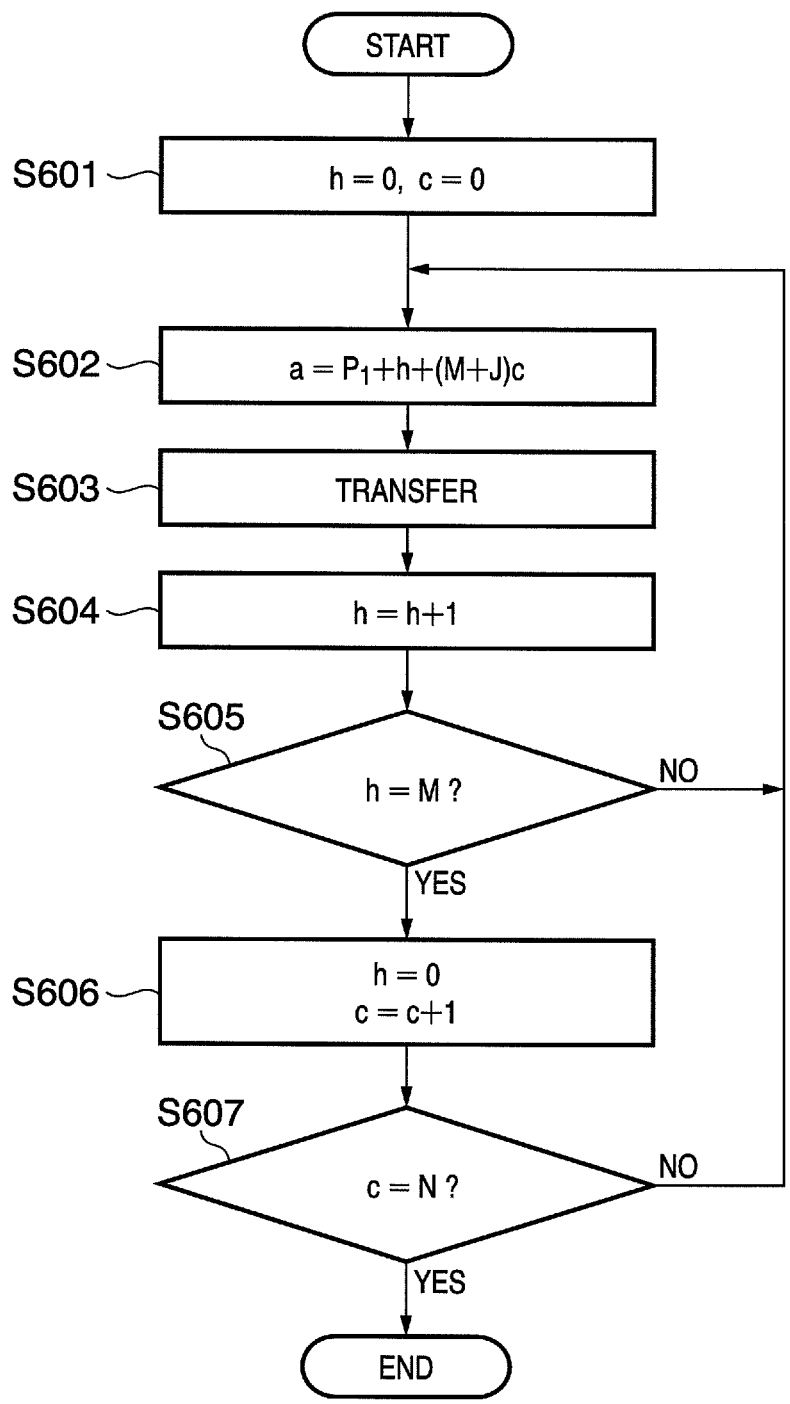
FIG. 6 is a flowchart showing an operation example of two-dimensional data transfer by the image sensing apparatus according to the first embodiment of the present invention.

FIG. 6 is a flowchart showing an operation of the two-dimensional data transfer described above. Referring to FIG. 6, P1, M, N and J correspond to P1, M N and J in FIG. 5A and are set in a setting register of the first control circuit 112 for the second buffer memory.

Referring to FIG. 6, counter values h and c are reset to 0 in step S601. In step S602, an address a is obtained from the counter values h and c (a=P1+h+(M+J)c). In step S603, image data in a rectangular area is sequentially transferred to the address a obtained in step S602.

In step S604, the counter value h is incremented by 1 (h=h+1). In step S605, it is determined whether the counter value h is equal to the number M of pixels (words) of one-line image data (h=M). If it is determined that the counter value h is equal to the number M of pixels (words) of one-line image data, i.e., if one-line image data is processed, the process advances to step S606. In step S606, the counter value h is reset (h=0) and the counter value c is incremented by 1 (c=c+1).

In step S607, the number of lines is compared with the counter value c, and it is determined whether the counter value c is equal to the number N of lines of the image data in the rectangular area to be transferred (c=N). If it is determined that the counter value c is equal to the number N of lines of the image data in the rectangular area to be transferred, i.e., if image data of all lines in the rectangular area is transferred, the operation of the transfer process ends.

On the other hand, if it is determined in step S605 that the counter value h is not equal to the number M of pixels (words) of one-line image data and it is determined in step S607 that the counter value c is not equal to the number N of lines of the image data in the rectangular area to be transferred, the process returns to step S602. Image data of a next line is transferred. Such process makes it possible to achieve the two-dimensional data transfer of image data.

Figure 7:
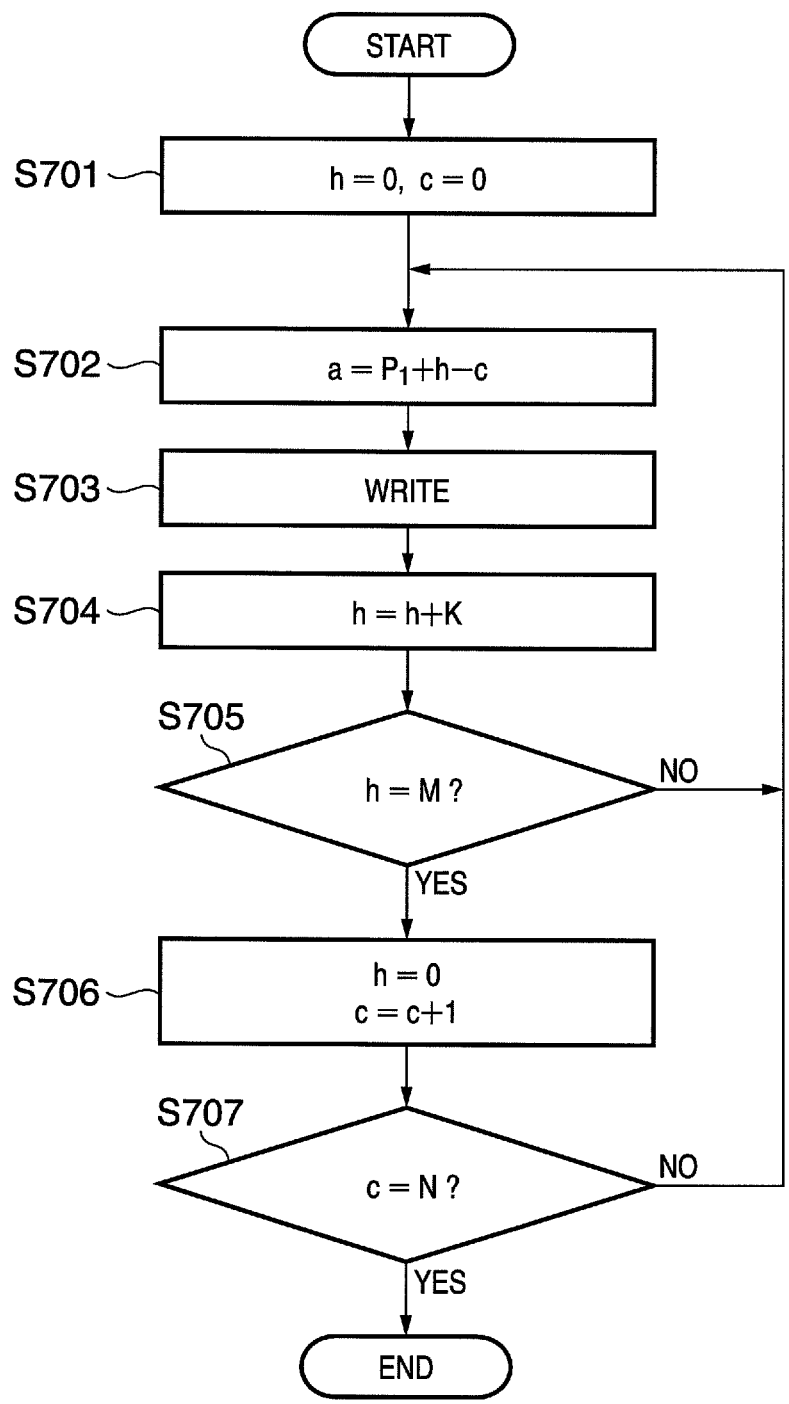
FIG. 7 is a flowchart showing an operation example of two-dimensional data transfer of the 90° rotation by the image sensing apparatus according to the first embodiment of the present invention.

FIG. 7 is a flowchart showing the procedure of an operation of two-dimensional data transfer including a rotation. Referring to FIG. 7, P1, M, N and K correspond to P1, M, N and K in FIG. 5B, and are set in a setting register of the second control circuit 114 for the second buffer memory.

Referring to FIG. 7, counter values h and c are reset in step S701. In step S702, an address a is obtained from the counter values h and c (a=P1+h−c). In step S703, the image data is written at the address a of the second buffer memory 113 obtained in step S702.

In step S704, an offset value K is added to the counter value h (h=h+K). In step S705, it is determined whether the counter value h is equal to the number M of lines (h=M). If the counter value h is equal to the number M of lines, i.e., if one-line image data is processed from P1 to P2 vertically, the process advances to step S706. In step S706, the counter value h is reset (h=0) and the counter value c is incremented by 1 (c=c+1). In step S707, the number of pixels (words) is compared with the counter value c, and it is determined whether the counter value c is equal to the number N of pixels of the rectangular area to be transferred (c=N). If it is determined that the counter value c is equal to the number N of pixels of the rectangular area to be transferred, i.e., if image data of all lines is transferred, the operation of the process ends.

On the other hand, if it is determined in step S705 that the counter value h is not equal to the number M of lines and it is determined in step S707 that the counter value c is not equal to the number N of pixels of the rectangular area to be transferred, the process returns to step S702. Image data of a next line is transferred. This process makes it possible to achieve the two-dimensional data transfer including a 90° rotation.

Figure 8:
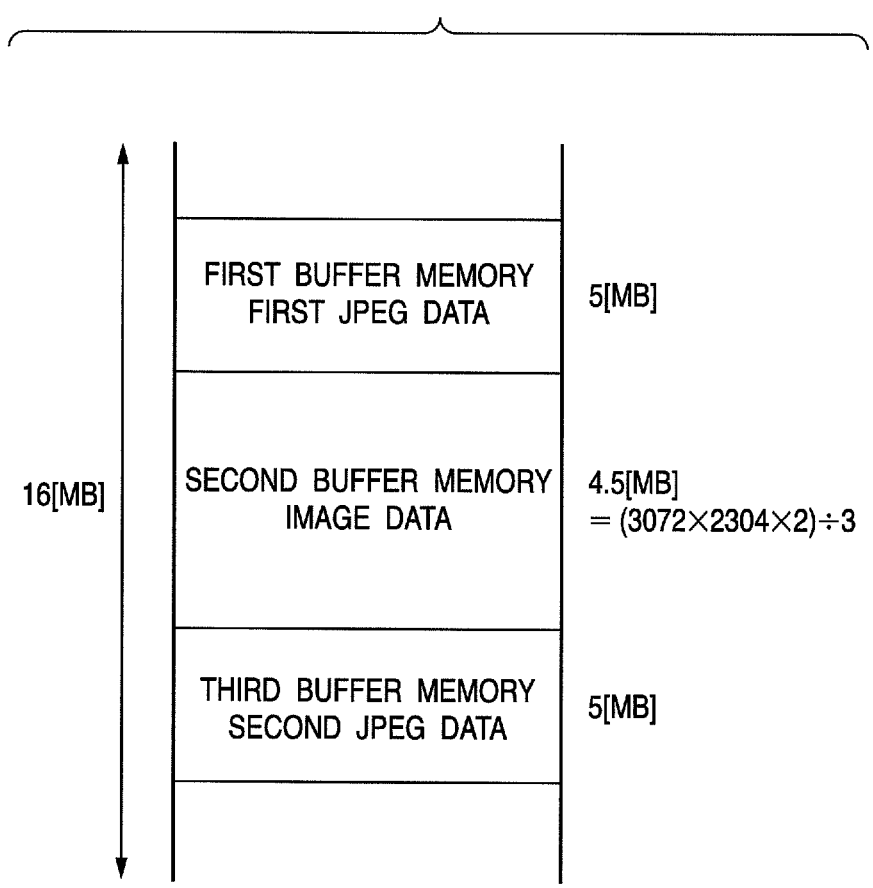
FIG. 8 is a view showing an example of buffer memory allocation in the image sensing apparatus according to the first embodiment of the present invention.

FIG. 8 is a view showing a structure of the first buffer memory 108, second buffer memory 113, and third buffer memory 117 on a single DRAM when the single DRAM is used independently instead of the DRAM 103. For example, the single DRAM has a capacity of 16 MB, and 5 MB out of them are allocated to the first buffer memory 108 as first JPEG-compressed image data area of 3,072 (horizontal)×2,304 (vertical) pixels.

Further, 4.5 MB are allocated to the second buffer memory 113, which is calculated by dividing the image area of 3,072 (horizontal)×2,304 (vertical) pixels in the YUV422 format (2 bytes per pixel) by three.

$$= 3{,}072 \times 2{,}304 \times 2/3$$
$$= 4{,}718{,}592 \ [byte]$$
$$= 4.5 \ [MB]$$

Assuming that the data amount is reduced to about ⅓ the original image data by performing a variable length coding, 5 MB are allocated to the third buffer memory 117 as the second JPEG-compressed image data area of 2,304 (horizontal)×3,072 (vertical) pixels.

Figure 9:
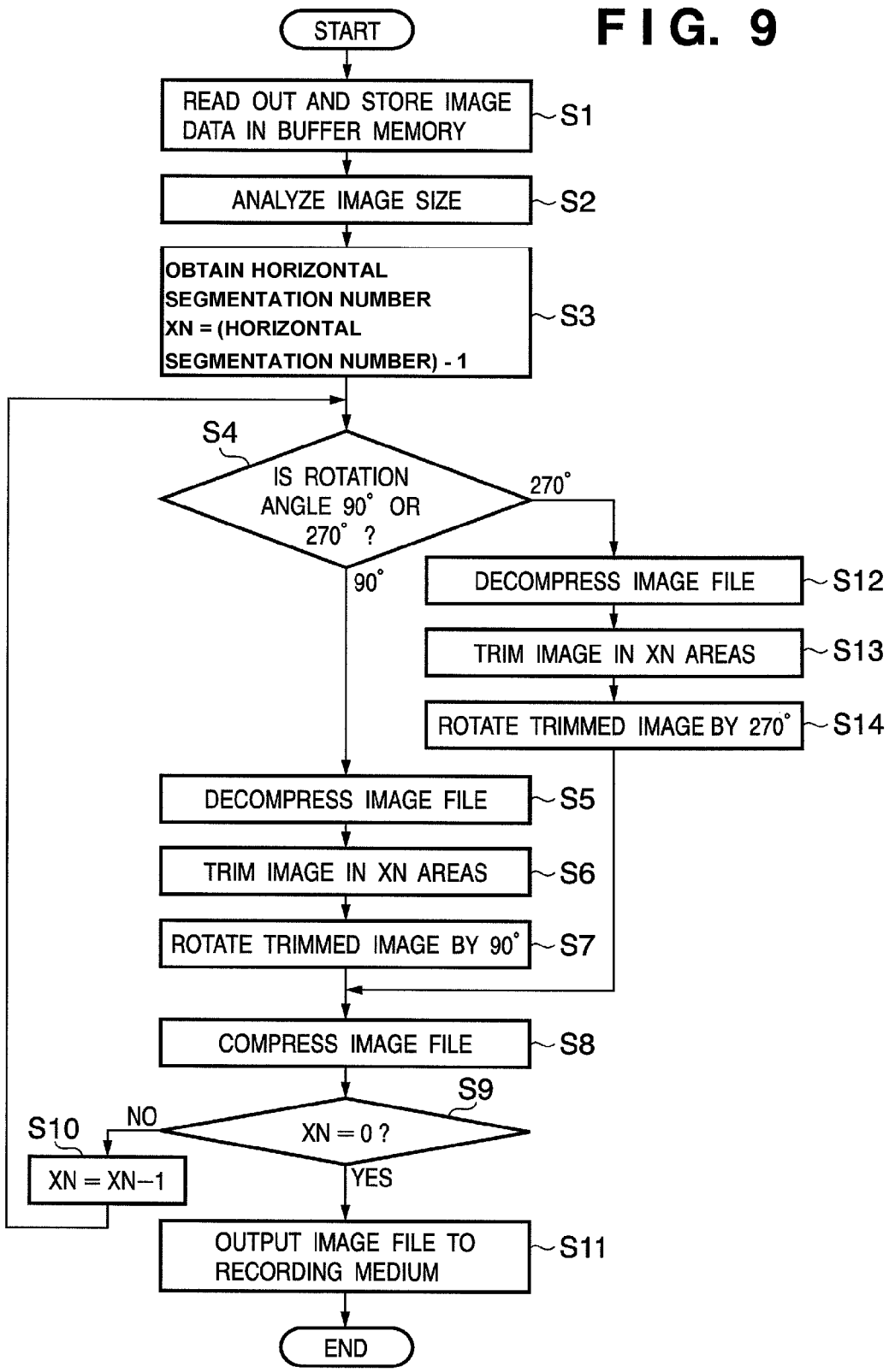
FIG. 9 is a flowchart showing an operation example by the image sensing apparatus according to the first embodiment of the present invention.

The operation of an image rotation according to the first embodiment will now be described in detail on the basis of a flowchart in FIG. 9. The following case will be explained as a practical example. That is, JPEG-compressed image data, whose aspect ratio of an original image size is 4:3, i.e., 3,072 (horizontal) pixels:2,304 (vertical) pixels, is rotated by 90° to generate JPEG-compressed image data of 2,304 (horizontal)×3,072 (vertical) pixels.

When the process starts, the CPU 100 transfers the JPEG-compressed image data on the recording medium 106 to the first buffer memory 108 via the system bus 101 in step S1. In step S2, the CPU 100 reads out the horizontal and vertical sizes from the JPEG-compressed image data on the first buffer memory 108 to determine the data size of 3,072 (horizontal)×2,304 (vertical) pixels. In step S3, the CPU 100 obtains a capacity available in the second buffer memory 113.

The capacity available in the second buffer memory 113 is calculated by subtracting the capacity of the first buffer memory 108 and that of the third buffer memory 117 from the capacity of 16 MB of the DRAM. That is, 6 MB are allocated to the second buffer memory 113.

$$= 16 - (5 \times 2)$$
$$= 6 \ [MB]$$

In step S3, the CPU 100 obtains, from the capacity available in the second buffer memory 113, the number (horizontal segmentation number; the "horizontal" direction herein being defined based on the pre-rotated image such as the image shown by the symbol 2a in FIG. 2) of times of repetition of a JPEG decompression. The number of times of repetition of a JPEG decompression is calculated by dividing the decompressed image data size by the capacity available in the second buffer memory 113, and then rounding up fractions below the decimal point of the resultant value. Specifically:

$$\text{(the decompressed image data size)} = 3{,}072 \times 2{,}304 \times 2$$
$$= 14{,}155{,}776 \ [byte]$$
$$= 13.5 \ [MB]$$

$$\text{(the decompressed image data size)} / $$
$$\text{(the capacity available in the second buffer memory)} = 13.5/6 = 2.25$$

Therefore:
(the horizontal segmentation number)=3 where XN is set to 2 obtained by (the horizontal segmentation number)−1.

In step S4, the CPU 100 determines the designation of rotation angle of the image. If the 90° rotation shown in 2a to 2l of FIG. 2 is designated, the process advances to step S5. In step S5, the first control circuit 112 for the second buffer memory controls to DMA-transfer the JPEG-compressed image data from the first buffer memory 108 to the decompression circuit 110. The decompression circuit 110 decompresses the JPEG-compressed image data for each block, and sequentially outputs raster data of 512×8 pixels for each block in the order of [0, 0] to [5, 0], [0, 1] to [5, 1], . . . , [0, 277] to [5, 277], as shown in 4a of FIG. 4.

In step S6, the trimming circuit 111 extracts the image data 202 (XN area) of two horizontal blocks or the first and second horizontal blocks, i.e., left 1,024×2,304 pixels shown in 4b of FIGS. 4 and 2b of FIG. 2 from the image data which is output from the decompression circuit 110, shown in 4a of FIGS. 4 and 2a of FIG. 2. The trimming circuit 111 discards image data of the four remaining horizontal blocks or the third, fourth, fifth and sixth horizontal blocks, i.e., the remaining 2,048×2,304 pixels (trimming operation).

In step S7, the first control circuit 112 for the second buffer memory performs a 90° rotation on the image data 202 of 1,024×2,304 pixels extracted in the trimming circuit 111, as shown in 4c of FIGS. 4 and 2c of FIG. 2. The extracted image data 202 of 1,024×2,304 pixels is sequentially output in the order of [0, 0], [1, 0], [0, 1], [1, 1], . . . , [0, 277], [1, 277], as shown in 4b of FIG. 4.

The image data to be output undergoes the two-dimensional data transfer shown in FIG. 5A. This two-dimensionally transferred image data is sequentially transferred to the second buffer memory 113 by using the two-dimensional data transfer shown in FIG. 5B. With this process, it is possible to generate the rotated image data 203 of 2,304×1,024 pixels shown in FIGS. 4 and 2 as 4c and 2c on the second buffer memory 113.

In step S8, the second control circuit 114 for the second buffer memory transfers the 90°-rotated image data of 2,304× 1,024 pixels on the second buffer memory 113 to the compression circuit 115 in accordance with the flowchart of FIG. 6.

The compression circuit 115 performs a block coding process on the basis of a predetermined quantization table. The compression circuit 115 transfers the JPEG-compressed image data to the third buffer memory 117 to generate the second JPEG-compressed image data shown in 2d of FIG. 2.

In step S9, the CPU 100 determines XN=2, and the process advances to step S10. Since the process for one horizontal block ends, the CPU 100 calculates XN=XN−1 and sets XN=1 in step S10.

The process returns to step S4 to determine the rotation angle of the image. In this case, since the 90° rotation is designated as the preceding determination, the process repeats steps S5 to S8 to perform the operation shown in 2e to 2h of FIG. 2.

In step S5, the control circuit 109 for the first buffer memory controls to DMA-transfer the JPEG-compressed image data from the first buffer memory 108 to the decompression circuit 110 as in step S5 described above. The decompression circuit 110 decompresses the JPEG-compressed image data for each block, and sequentially outputs raster data of 512×8 pixels for each block in the order of [0, 0] to [5, 0], [0, 1] to [5, 1], . . . , [0, 277] to [5, 277], as shown in 4a of FIG. 4.

In step S6, the trimming circuit 111 discards the image data of two horizontal blocks or the first and second horizontal blocks, i.e., left 1,024×2,304 pixels, shown in 2e of FIG. 2, which is sequentially output from the decompression circuit 110. The trimming circuit 111 extracts the image data 212 of two horizontal blocks or the third and fourth horizontal blocks, i.e., 1,024×2,304 pixels. The trimming circuit 111 then discards the data of the two remaining horizontal blocks or the fifth and sixth horizontal blocks, i.e., the remaining 1,024×2,304 pixels.

In step S7, the first control circuit 112 for the second buffer memory performs the 90° rotation shown in 2g of FIG. 2 on the image data 212 of 1,024×2,304 pixels extracted in the trimming circuit 111. The extracted image data 212 of 1,024× 2,304 pixels undergoes the two-dimensional data transfer shown in FIG. 5A to obtain the image data to be output. This two-dimensionally transferred image data is sequentially transferred to the second buffer memory 113 by using the two-dimensional data transfer shown in FIG. 5B. The rotated image data 213 of 2,304×1,024 pixels shown in 2g of FIG. 2 is generated on the second buffer memory 113.

In step S8, the second control circuit 114 for the second buffer memory transfers the 90°-rotated image data 213 of 2,304×1,024 pixels on the second buffer memory 113 to the compression circuit 115 in accordance with the flowchart of FIG. 7. The compression circuit 115 performs a block coding process on the basis of a predetermined quantization table. The compression circuit 115 transfers the JPEG-compressed image data following the JPEG-compressed image data 204 on the third buffer memory 117 to generate the second JPEG-compressed image data shown in 2h of FIG. 2.

In step S9, the CPU 100 determines XN=1, and the process advances to step S10. Since the process for two horizontal blocks ends, the CPU 100 calculates XN=XN−1 and sets XN=0 in step S10.

The process returns to step S4 to determine the specified rotation angle of the image. In this case, since the 90° rotation is designated as the preceding determination, the process repeats steps S5 to S8 to perform the operation shown in 2*i* to 2*l* of FIG. 2.

In step S5, the control circuit 109 for the first buffer memory controls to DMA-transfer the identical JPEG-compressed image data from the first buffer memory 108 to the decompression circuit 110 as in step S5 described above. The decompression circuit 110 decompresses the JPEG-compressed image data for each block, and sequentially outputs raster data of 512×8 pixels for each block in the order of [0, 0] to [5, 0], [0, 1] to [5, 1], . . . , [0, 277] to [5, 277], as shown in 4*a* of FIG. 4.

In step S6, the trimming circuit 111 discards the image data of four horizontal blocks or the first, second, third, and fourth horizontal blocks, i.e., left 2,048×2,304 pixels, shown in 2*i* of FIG. 2, which is sequentially output from the decompression circuit 110. The trimming circuit 111 extracts the image data 222 of two horizontal blocks or the fifth and sixth horizontal blocks, i.e., 1,024×2,304 pixels. In step S7, the first control circuit 112 for the second buffer memory performs the 90° rotation shown in 2*k* of FIG. 2 on the image data 222 of 1,024×2,304 pixels extracted in the trimming circuit 111. The extracted image data 222 of 1,024×2,304 pixels undergoes the two-dimensional data transfer shown in FIG. 5A to obtain the data to be output. This two-dimensionally transferred data is sequentially transferred to the second buffer memory 113 by using the two-dimensional data transfer shown in FIG. 5B. The rotated image data 223 of 2,304×1,024 pixels shown in 2*k* of FIG. 2 is generated on the second buffer memory 113.

In step S8, the second control circuit 114 for the second buffer memory transfers the 90°-rotated image data 223 of 2,304×1,024 pixels on the second buffer memory 113 to the compression circuit 115 in accordance with the flowchart of FIG. 7. The compression circuit 115 performs a block coding on the basis of a predetermined quantization table. The compression circuit 115 transfers the JPEG-compressed image data to the third buffer memory 117 following the JPEG-compressed image data 214. Consequently, the second JPEG-compressed image data shown in 2*l* of FIG. 2 is generated.

In step S9, the CPU 100 determines XN=0, and the process advances to step S11. In step S11, the CPU 100 writes the JPEG-compressed image data of the third buffer memory 117 into the recording medium 106 so that the JPEG-compressed image data is transferred to the recording medium 106. With this process, it is possible to record the rotated JPEG-compressed image data even when there is no memory area to rasterize the JPEG-compressed image data.

The processes in steps S12 to S14 are performed in the same manner except that the specified rotation angle is different, and a description thereof will be omitted.

The embodiment, in which the rotated JPEG-compressed image data completes and then is transferred to the recording medium, has been described. However, it is also possible to have the following configuration. That is, the JPEG-compressed image data with a predetermined size completes, and then is sequentially transferred to the recording medium. The embodiment, in which the JPEG-compressed image data is read out from the recording medium and then undergoes a decompression process, has been explained. However, it is also possible to have the following configuration. That is, the JPEG-compressed image data with a predetermined size is read out, and then undergoes a decompression process to be sequentially read out.

The embodiment, in which the rotated JPEG-compressed image data completes and then is transferred to the recording medium, has been described. However, it is possible to have the following configuration.

That is, the JPEG-compressed image data is transferred to an external apparatus such as a printer via an interface or the like. The case in which each process is performed in a hardware has been described, but each process may be performed by software.

<Second Embodiment>

The second embodiment of the present invention will now be explained using FIGS. 10 to 13.

Figure 10:
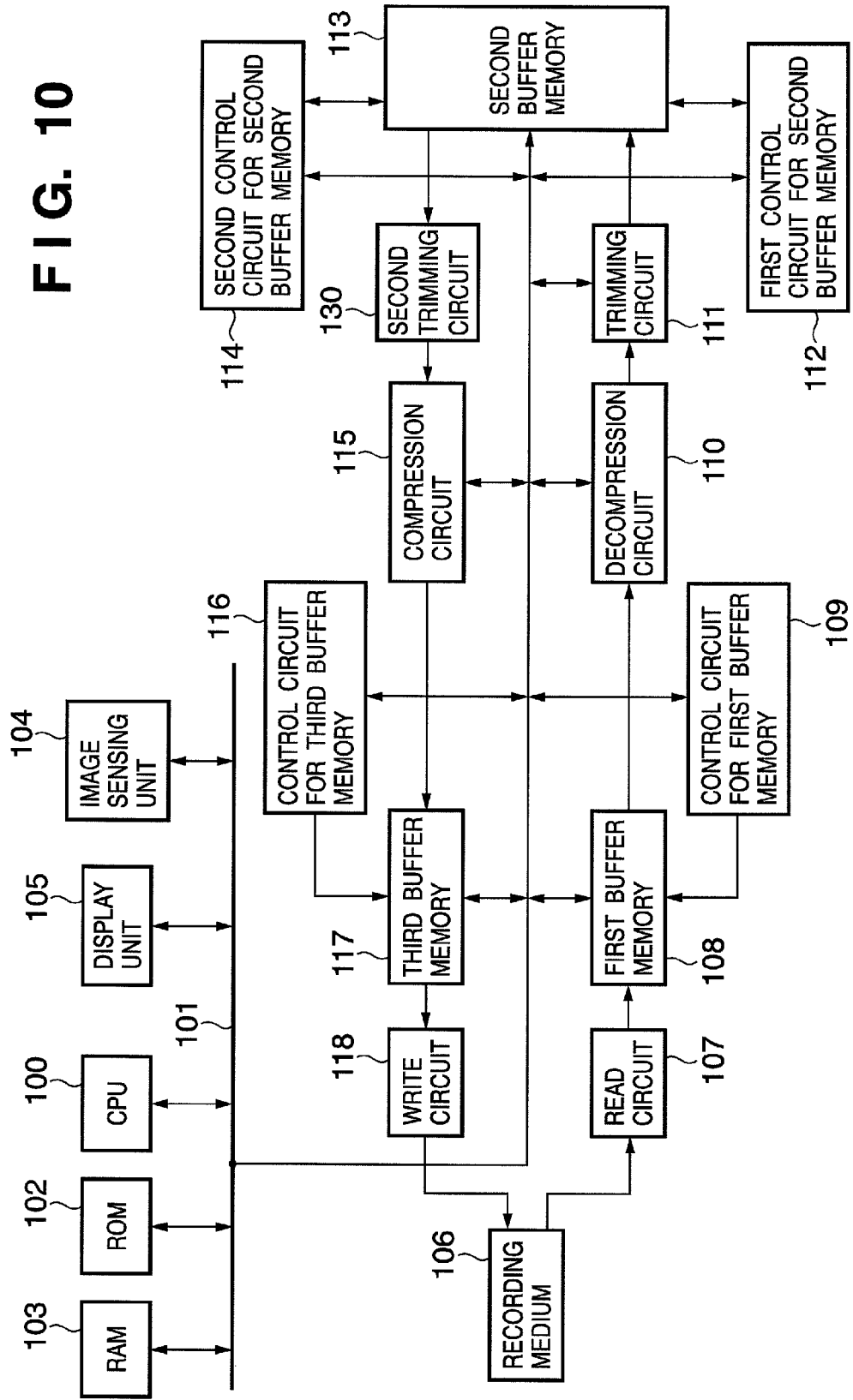
FIG. 10 is a block diagram showing an example of the system configuration of an image sensing apparatus as an image data processing apparatus according to the second embodiment of the present invention.

FIG. 10 is a block diagram schematically showing the system configuration of an image sensing apparatus as an image data processing apparatus according to the second embodiment of the present invention. A difference from the block diagram schematically showing the system configuration of the image sensing apparatus according to the first embodiment described above is that a second trimming circuit 130 is inserted between the second buffer memory 113 and the compression circuit 115. The other circuit blocks are the same as those in the first embodiment described with reference to FIG. 1 and a description thereof will be omitted.

Figure 11:
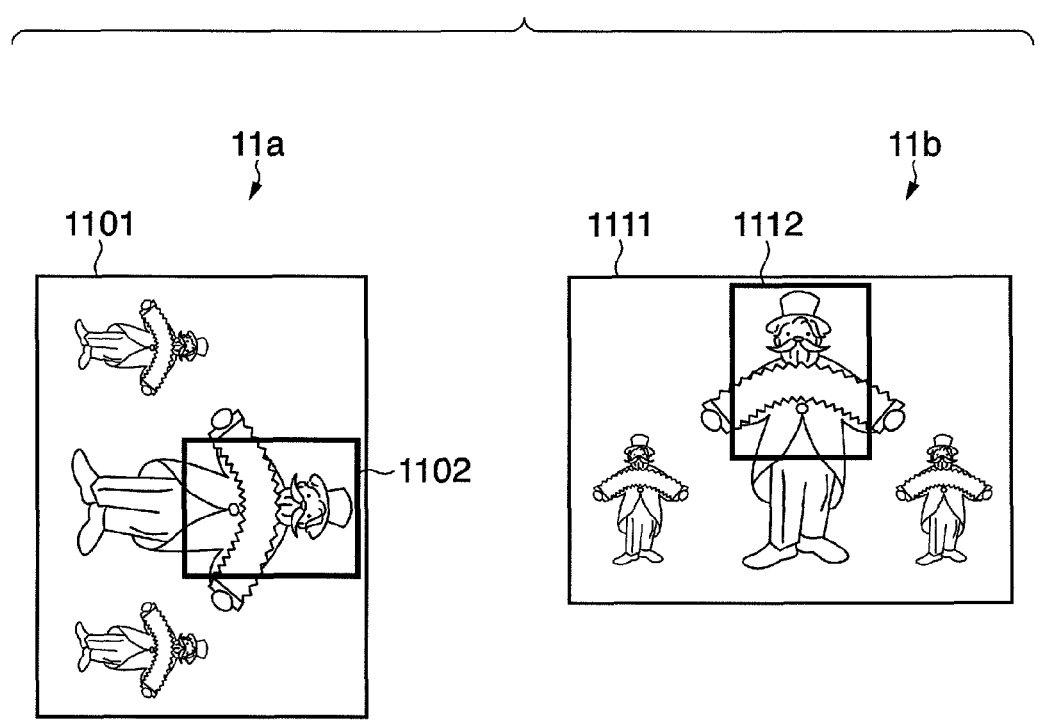
FIG. 11 is a view for explaining the concept of a trimming process by the image sensing apparatus according to the second embodiment of the present invention.

Reference symbols 11*a* and 11*b* in FIG. 11 are conceptual views of a trimming process for a rotated image data using the image sensing apparatus shown in FIG. 10. In FIG. 11, 11*a* shows the relationship of the rotated, enlarged image data on, e.g., the display unit 105. In 11*a*, reference numeral 1101 denotes a whole image rotated clockwise by 90°; and 1102, a display image displayed on the display unit 105, which is obtained by enlarging part of the whole image 1101. In FIG. 11, 11*b* shows the relationship between the original image and the rotated, enlarged image on the display unit 105. In this case, the original image does not rotate with respect to the display image. In 11*b*, reference numeral 1111 denotes the original image for the whole image 1101, which has not been rotated clockwise by 90°. Reference numeral 1112 denotes a trimming area of the original image corresponding to the whole image 1101 displayed on the display unit 105.

Reference symbols 12*a* to 12*d* in FIG. 12 are views for explaining an operation of trimming JPEG-compressed image data and rotating the trimmed image data by 90°. In FIG. 12, 12*a* shows a state in which the JPEG-compressed image data compression-coded for each block is decompressed for each block to output raster data for each block, 12*b* shows a state for each block after a masking process, 12*c* shows a state in which the image data for each block undergoes a 90° rotation, and 12*d* shows an image process, for JPEG-compressed image data, of trimming a rectangular area from the 90°-rotated image data.

Similarly to the first embodiment, FIG. 8 is a view showing a buffer memory structure of the first buffer memory 108, second buffer memory 113, and third buffer memory 117 on a single DRAM when the single DRAM is used independently of the DRAM 103. The DRAM has a capacity of 16 MB. In this case, 5 MB are allocated to the first buffer memory 108 as the first JPEG-compressed image data area of 3,072 (horizontal)×2,304 (vertical) pixels.

A 2.5-MB of image area of 1,288 (horizontal)×1,024 (vertical) pixels in the YUV422 format (2 bytes per pixel) is allocated in the second buffer memory 113.

$$= 1{,}288 \times 1{,}024 \times 2$$
$$= 2{,}637{,}824 \text{ [byte]}$$
$$= 2.5 \text{ } [MB]$$

5.0 MB are allocated to the third buffer memory 117, similarly to the first embodiment.

Figure 13:
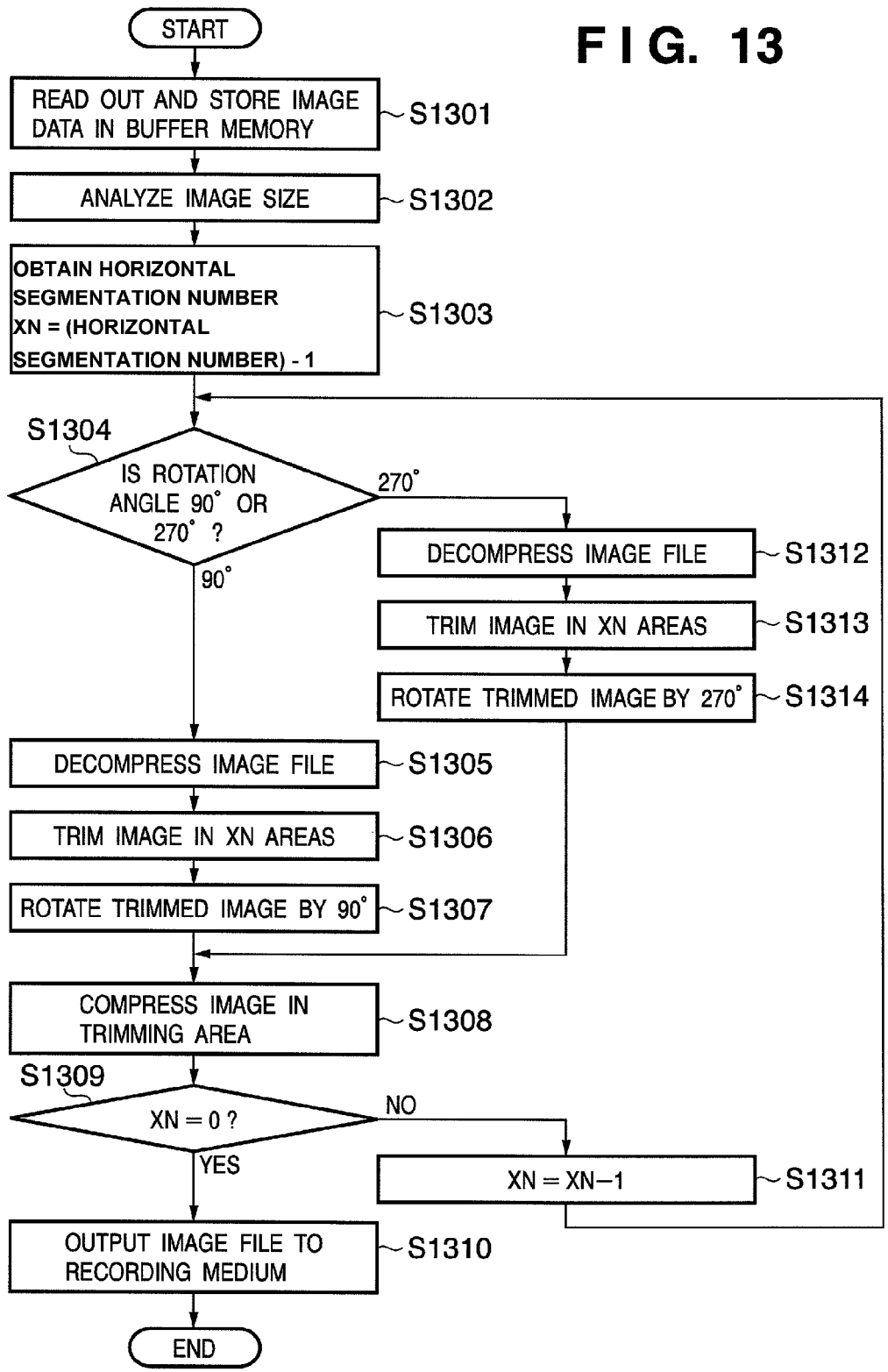
FIG. 13 is a flowchart showing an operation example by the image sensing apparatus according to the second embodiment of the present invention.

An operation of rotation process according to the second embodiment will now be described in detail in accordance with a flowchart shown in FIG. 13. The following case will be explained as a practical example. That is, an image of 960 (horizontal)×1,280 (vertical) pixels is extracted from trimming-designated position of 1056th horizontal pixel and 4th vertical pixel from JPEG-compressed image data whose aspect ratio of an original image size is 4:3, i.e., 3,072 (horizontal) pixels:2,304 (vertical) pixels. The extracted image is rotated by 90° to generate JPEG-compressed image data of 1,280 (horizontal)×960 (vertical) pixels.

When the process starts, the CPU 100 transfers the JPEG-compressed image data on the recording medium 106 to the first buffer memory 108 via the system bus 101 in step S1301. In step S1302, the CPU 100 reads out the horizontal and vertical sizes from the JPEG-compressed image data on the first buffer memory 108 to determine the data size of 3,072 (horizontal)×2,304 (vertical) pixels. In step S1303, the CPU 100 obtains the capacity available in the second buffer memory 113.

The capacity available in the second buffer memory 113 is calculated by subtracting the capacity of the first buffer memory 108 and that of the third buffer memory 117 from the capacity of 16 MB of DRAM. Therefore, 6 MB are allocated to the second buffer memory 113.

$$= 16 - (5 \times 2)$$
$$= 6 \text{ } [MB]$$

That is, in step S1303, the CPU 100 obtains, from the capacity available in the second buffer memory 113, the number (horizontal segmentation number; the "horizontal" direction herein is defined based on the pre-rotated image such as the image shown by the symbol 2*a* in FIG. 2) of times of repetition of a JPEG decompression process. The number of times of repetition of a JPEG decompression process is calculated by dividing the decompressed image data size by the capacity available in the second buffer memory 113, and then rounding up fractions below the decimal point of the resultant value. Specifically:

$$\text{(the decompressed image data size)} = 1{,}288 \times 1{,}024 \times 2$$
$$= 2{,}637{,}824 \text{ [byte]}$$
$$= 2.5 \text{ } [MB]$$

(the decompressed image data size)/

(the capacity available in the second buffer memory) = 2.5/6 = 0.42 therefore
(the horizontal segmentation number)=1
where XN is set to 0 obtained from (the horizontal segmentation number)−1.

In step S1304, the CPU 100 determines the designated rotation angle of the image. If the 90° rotation is designated, the process advances to step S1305. In step S1305, the first control circuit 112 for the second buffer memory controls to DMA-transfer the JPEG-compressed image data from the first buffer memory 108 to the decompression circuit 110. The decompression circuit 110 decompresses the JPEG-compressed image data for each block, and sequentially outputs raster data of 512×8 pixels for each block in the order of [0, 0] to [5, 0], [0, 1] to [5, 1], ..., [0, 277] to [5, 277], as shown in 11*a* of FIG. 11.

The process then advances to S1306. In step S1306, the trimming circuit 111 extracts the image data (XN area) of two horizontal blocks or the third and fourth horizontal blocks and 161 vertical blocks or the first to 161st vertical blocks, i.e., 1,024×1,288 pixels, shown in 12*b* of FIG. 12 from the image data which is sequentially output from the decompression circuit 110, shown in 12*a* of FIG. 12. The trimming circuit 111 discards the image data of the four remaining horizontal blocks or the first, second, fifth and sixth horizontal blocks and the 162nd to 287th remaining vertical blocks (trimming operation).

The process advances to step S1307. In step S1307, the first control circuit 112 for the second buffer memory performs a 90° rotation shown in 12*c* of FIG. 12 on the image data of 1,024×1,288 pixels extracted in the trimming circuit 111. The extracted image data of 1,024×1,288 pixels is sequentially output in the order of [2, 0], [3, 0], [2, 1], [3, 1], ..., [2, 160], [3, 160], as shown in 12*b* of FIG. 12.

The data to be output undergoes the two-dimensional data transfer shown in FIG. 5A. This two-dimensionally transferred data is sequentially transferred to the second buffer memory 113 by using the two-dimensional data transfer shown in FIG. 5B. With this process, it is possible to generate the rotated image data of 1,288×1,024 pixels shown in 11*c* of FIG. 11 on the second buffer memory 113.

In step S1308, the second control circuit 114 for the second buffer memory performs a process in accordance with the flowchart of FIG. 6 used in the first embodiment. That is, the second trimming circuit 130 extracts an image of 1,280 (horizontal)×960 (vertical) pixels from the position of 4th horizontal pixel and 32nd vertical pixel from the 90°-rotated image data of 1,288×1,024 pixels on the second buffer memory 113, and transfers the extracted image to the compression circuit 115.

The compression circuit 115 performs a block coding process on the basis of a predetermined quantization table. The compression circuit 115 transfers the JPEG-compressed image data to the third buffer memory 117 to generate the second JPEG-compressed image data shown in 12*d* of FIG. 12.

In step S1309, the CPU 100 determines XN=0, and the process advances to step S1311. In step S1311, the CPU 100 writes the JPEG-compressed image data on the third buffer memory 117 into the recording medium 106 so that the JPEG-compressed image data is transferred to the recording medium 106. With this process, it is possible to record the rotated JPEG-compressed image data even when there is no memory area to rasterize the JPEG-compressed image data. Note that the processes in steps S1312 to 1314 are performed in the same manner, and a description thereof will be omitted.

The object of the present invention is also achieved when a storage medium which records software program codes for implementing the functions of the above-described embodiments is supplied to a system or apparatus, and the computer (or the CPU or MPU) of the system or apparatus reads out and executes the program codes stored in the storage medium.

In this case, the program codes read out from the storage medium implement the functions of the above-described embodiments, and the storage medium which stores the program codes constitutes the present invention.

The storage medium for supplying the program codes includes a flexible disk, hard disk, optical disk, magneto-optical disk, CD-ROM, CD-R, magnetic tape, nonvolatile semiconductor memory card, and ROM.

The functions of the above-described embodiments are implemented when the computer executes the readout program codes. Also, the functions of the above-described embodiments are implemented when an OS (Operating System) or the like running on the computer performs some or all of actual processes on the basis of the instructions of the program codes.

Furthermore, the present invention includes a case in which, after the program codes read out from the storage medium are written in the memory of a function expansion board inserted into the computer or the memory of a function expansion unit connected to the computer, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-325296 filed on Nov. 9, 2005 and Japanese Patent Application No. 2006-240793 filed on Sep. 5, 2006, which are hereby incorporated by reference herein in their entirety.

What is claimed is:

1. An image data processing apparatus comprising:
a first memory for use in storing compressed image data;
a second memory for use in storing a portion of the image data which has been decompressed and rotated;
a third memory for use in storing an entirety of the image data which has been decompressed, rotated, and re-compressed;
a segmentation number decision unit constructed to decide a number of image data segments for the image data based on (i) a data size obtained by decompressing the image data stored in the first memory and (ii) the capacity of the second memory;
a decompression unit constructed to decompress the image data read out from the first memory and to repeat an operation of outputting one of the image data segments obtained by segmenting the decompressed image data into the decided number of image data segments and of discarding the rest of the image data segments, thereby sequentially outputting the decided number of the image data segments one by one;
a rotation unit constructed to sequentially perform a rotation process on the image data segments output from the decompression unit, and to sequentially store the rotated image data segments in the second memory; and
a compression unit constructed to compress the rotated image data segments read out from the second memory and to store the rotated and compressed image data segments in the third memory,
wherein in sequentially outputting the image data segments one by one, the decompression unit outputs a next one of the image data segments after the rotated and compressed image data segment originating from a previously output one of the image data segments is stored in the third memory by the compression unit.

2. The apparatus according to claim 1, wherein the decompression unit segments the decompressed image data in a horizontal direction, and wherein the horizontal direction is a horizontal direction of an image represented by the image data that has not yet undergone the rotation process.

3. The apparatus according to claim 2, wherein the rotation unit sequentially performs a 90° rotation on the image data segments from the image data segment positioned on the left side of the image to the image data segment positioned on the right side of the image in order.

4. The apparatus according to claim 2, wherein the rotation unit sequentially performs a 270° rotation on the image data segments from the image data segment positioned on the right side of the image to the image data segment positioned on the left side of the image in order.

5. The apparatus according to claim 1, wherein the image data is JPEG-compressed image data.

6. The apparatus according to claim 1, wherein the first memory, the second memory, and the third memory are implemented in the same physical memory.

7. An image data processing method in an image data processing apparatus, the image data processing apparatus comprising:
a first memory for use in storing compressed image data;
a second memory for use in storing a portion of the image data which has been decompressed and rotated; and
a third memory for use in storing an entirety of the image data which has been decompressed, rotated, and re-compressed,
the method comprising:
deciding a number of image data segments for the image data based on (i) a data size obtained by decompressing the image data stored in the first memory and (ii) the capacity of the second memory;
decompressing the image data read out from the first memory and repeating an operation of outputting one of the image data segments obtained by segmenting the decompressed image data into the decided number of image data segments and of discarding the rest of the image data segments, thereby sequentially outputting the decided number of image data segments one by one;
sequentially performing a rotation process on the image data segments output in repeating the operation of outputting one of the image data segments;
sequentially storing the rotated image data segments in the second memory;
compressing the rotated image data segments read out from the second memory; and
storing in the third memory the rotated and compressed image data segments obtained in the compressing step,
wherein in the step of repeating the operation of outputting one of the image data segments, a next one of the image data segments is output after the rotated and compressed image data segment originating from a previously output one of the image data segments is stored in the third memory.

8. The method according to claim 7, wherein the image data is JPEG-compressed image data.

9. An image data processing apparatus comprising:
a first memory for use in storing compressed image data comprising a plurality of blocks;
a second memory for use in storing a portion of the image data which has been decompressed and rotated;

a third memory for use in storing an entirety of the image data which has been decompressed, rotated, and re-compressed;

a segmentation number decision unit constructed to decide a segmentation number for the image data based on (i) a data size obtained by decompressing the image data stored in the first memory and (ii) the capacity of the second memory;

a decompression unit constructed to decompress each block of the image data read out from said first memory and to repeat an operation of outputting one of the image data segments obtained by segmenting the decompressed image data into the decided number of image data segments in units of integer multiples of the blocks and of discarding the rest of the image data segments, thereby sequentially outputting the decided number of image data segments one by one;

a rotation unit constructed to sequentially perform a rotation process on the image data segments output from the decompression unit in units of integer multiples of the blocks, and to sequentially store the rotated image data segments in the second memory; and a compression unit constructed to compress the rotated image data segments read out from the second memory and to store the rotated and compressed image data segments in the third memory, wherein in sequentially outputting the image data segments one by one, the decompression unit outputs a next one of the image data segments after the rotated and compressed image data segment originating from a previously output one of the image data segments is stored in the third memory by the compression unit.

10. The apparatus according to claim 9, wherein the image data is JPEG-compressed image data.

11. An image data processing apparatus comprising:

a first memory for use in storing compressed image data comprising a plurality of blocks;

a second memory for use in storing a portion of the image data which has been decompressed and rotated;

a third memory for use in storing an entirety of the image data which has been decompressed, rotated, and re-compressed;

a segmentation number decision unit constructed to decide a number of image data segments for the image data based on (i) a data size obtained by decompressing the image data stored in the first memory and (ii) the capacity of the second memory;

a decompression unit constructed to decompress each block of the image data read out from the first memory and to repeat an operation of trimming one of the image data segments obtained by segmenting the decompressed image data into the decided number of image data segments in units of integer multiple of the blocks and of discarding rest of the image data segments, thereby sequentially outputting the decided number of the image data segments one by one;

a rotation unit constructed to sequentially perform a rotation process on the image data segments output from the decompression unit in units of integer multiples of the blocks, and to sequentially store the rotated image data segments in the second memory; and a compression unit constructed to compress the rotated image data segments read out from the second memory and to store the rotated and compressed image data segments in the third memory, wherein in sequentially outputting the image data segments one by one, the decompression unit outputs a next one of the image data segments after the rotated and compressed image data segment originating from a previously output one of the image data segments is stored in the third memory by the compression unit.

12. The apparatus according to claim 11, wherein the image data is JPEG-compressed image data.

13. An image data processing apparatus comprising:

a first memory for use in storing compressed image data comprising a plurality of blocks;

a trimming designation unit constructed to designate a trimming area of the image data;

a second memory for use in storing a portion of the trimming area which has been decompressed and rotated;

a third memory for use in storing an entirety of the trimming area which has been decompressed, rotated, and re-compressed;

a segmentation number decision unit constructed to decide a number of image data segments for the trimming area based on (i) a data size obtained by decompressing an integer multiple of the blocks containing the trimming area of the image data stored in the first memory and (ii) the capacity of the second memory;

a decompression unit constructed to decompress each block of the image data read out from the first memory and to repeat an operation of outputting one of the image data segments obtained by segmenting the integer multiple of blocks containing the trimming area of the decompressed image data into the decided number of image data segments in units of integer multiples of the blocks and of discarding the rest of the image data segments, thereby sequentially outputting the decided number of the image data segments one by one;

a rotation unit constructed to sequentially perform a rotation process on the image data segments output from the decompression unit in units of integer multiples of the blocks, and to sequentially store the rotated image data segments in the second memory;

a trimming unit constructed to trim the image data segments stored in the second memory in accordance with the trimming area designated by the trimming designation unit;

a compression unit constructed to compress the image data of the trimming area trimmed by the trimming unit and to store the trimmed and compressed image data in the third memory, wherein in sequentially outputting the image data segments one by one, the decompression unit outputs a next one of the image data segments after the trimmed and compressed image data originating from a previously output one of the image data segments is stored in the third memory by the compression unit.

14. A non-transitory computer-readable storage medium retrievably storing a program to cause a computer to execute the image data processing method of claim 7.

* * * * *